J. K. Mayo,
Circular Saw Mill.
N° 3,494.    Patented Mar. 20, 1844.
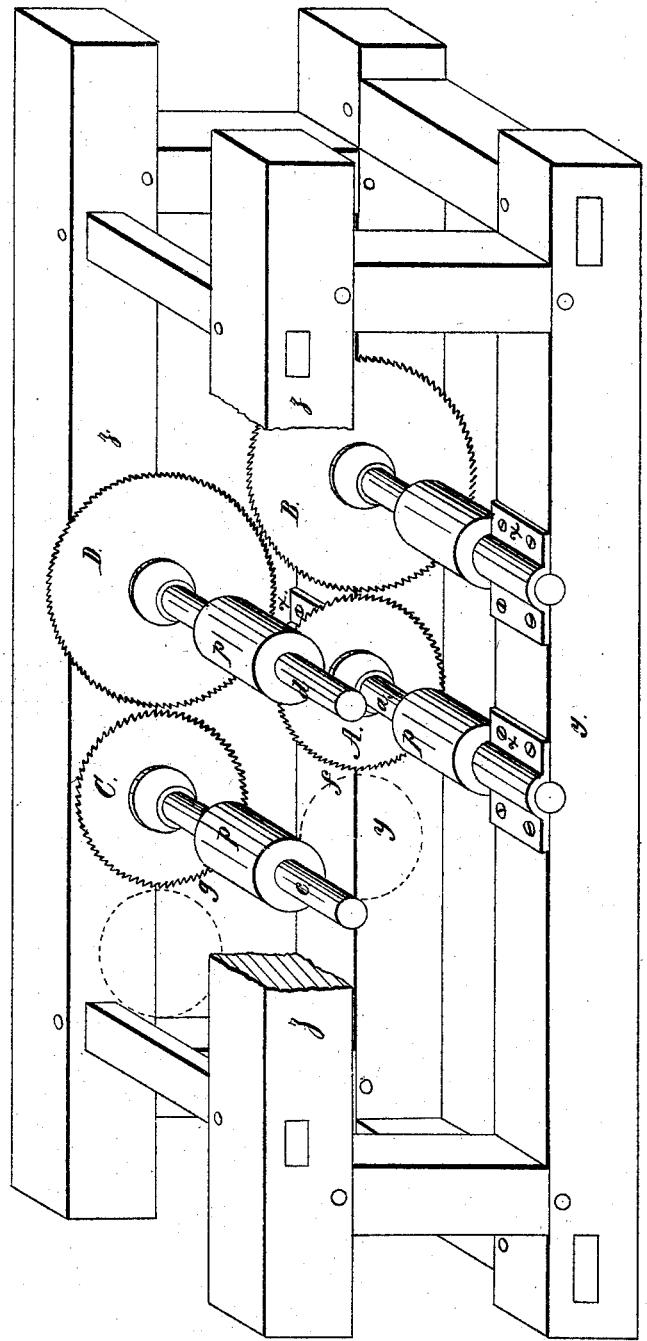

UNITED STATES PATENT OFFICE.

JNO. K. MAYO, OF ORRINGTON, MAINE.

MANNER OF APPLYING CIRCULAR SAWS FOR SAWING LUMBER, &c.

Specification of Letters Patent No. 3,494, dated March 20, 1844.

*To all whom it may concern:*

Be it known that I, JOHN K. MAYO, of Orrington, in the county of Penobscot and State of Maine, have invented a new and useful Improvement on Sawmills; and I do hereby declare that the following is a full, clear, and exact description of the construction and operation of the same, reference being had to the annexed drawing, making a part of this specification and which is an isometrical projection.

*Construction.*—In a suitable framework are placed the circular saws, A, B, C and D, in the following manner. In the boxes $x$, which are fastened to the upperside of the lower longitudinal rails $y$ of said frame, revolve the gudgeons of the transverse shafts $a$ and $b$, to which the saws A and B are fastened in a vertical position. The axes of these saws are on a level with each other, but they (the saws) differ in size, the diameter of the front-saw A being less than that of saw B. They are placed as near together as possible, without their peripheries touching each other. One or more additional saws may be placed in front of A, each preceding one being of less diameter than the one next following, as by dots indicated on the drawing.

To the underside of the longitudinal top-rails $z$ (of the frame) are fastened the boxes, in which the gudgeons of the shafts $c$ and $d$ of the saws C and D move, all of which are placed and arranged in a similar manner as the lower-ones aforedescribed. To these also may be added other saws in front.

The relative position of the upper and lower sets of saws, is as shown on drawing, viz: all the saws are placed in the same plane, but the upper saw of every two corresponding-ones (as at instance the saw B of set A and B) advances somewhat from the lower saw, so that a line drawn through their axes, and perpendicular with them, would form an angle of about 65 degrees with the horizon.

The shafts are furnished with a pulley $p$ each, for the reception of belts, by means of which, and other known contrivances, the saws are put in operation.

*Operation.*—The machinery having been set in motion, the log of wood to be sawed, first strikes the saw A at $f$, which cleaves it partly in two. It then passes on to the larger saw B, which enters the scarf made by A, and severs the board or piece from the log. Such is the operation when only one set or series of saws (say A and B) is used. When both are worked (as in case of very heavy timber) the log of course first strikes the saw C at $g$, and next the saw A at $f$, the scarf made by the former being followed up by saw D, and that made by the latter by saw B. The same principle prevails, when additional saws are made use of, as above suggested, whether with one or both sets.

What I claim as my invention, and desire to secure by Letters Patent, is—

The combination of two or more circular saws, every preceding-one of less diameter than the next-following-one, their respective axes being on a common level; or two sets or series of saws, of that description, one above the other, for the purpose of sawing, together in the same scarf, timber, lumber, &c., in an easier and better manner than heretofore done; the whole being constructed and operating as hereinabove set forth.

I do not claim the application of two saws only, one above the other, for the purpose of sawing together in the same scarf.

JOHN K. MAYO.

Witnesses:
SAMUEL GARNSEY,
ASA WALKER.